US012691029B2

(12) United States Patent
Howe

(10) Patent No.: US 12,691,029 B2
(45) Date of Patent: Jul. 28, 2026

(54) RAPID HEATING AND COOLING SYSTEM UTILIZING MECHANICAL AND THERMAL THERAPY

(71) Applicant: Diferynt Innovation LLC, Boulder, CO (US)

(72) Inventor: Todd Howe, Fort Collins, CO (US)

(73) Assignee: Diferynt Innovation LLC, Boulder, CO (US)

( * ) Notice: Subject to any disclaimer, the term of this patent is extended or adjusted under 35 U.S.C. 154(b) by 817 days.

(21) Appl. No.: 18/055,013

(22) Filed: Nov. 14, 2022

(65) Prior Publication Data

US 2023/0144593 A1 May 11, 2023

Related U.S. Application Data

(60) Provisional application No. 63/278,256, filed on Nov. 11, 2021.

(51) Int. Cl.
*A61H 15/00* (2006.01)

(52) U.S. Cl.
CPC ..... *A61H 15/00* (2013.01); *A61H 2015/0014* (2013.01); *A61H 2201/0149* (2013.01); *A61H 2201/0207* (2013.01); *A61H 2201/0214* (2013.01)

(58) Field of Classification Search
CPC .... A61H 2201/0146; A61H 2201/0111; A61H 2201/024; A61H 2201/0149; A61H 2201/0242; A61H 2201/1654; A61H 33/0095; A61H 15/00; A61H 2201/501; A61F 7/0056; A61F 2007/0054; A61F 2007/0225
See application file for complete search history.

(56) References Cited

U.S. PATENT DOCUMENTS

| | | | | |
|---|---|---|---|---|
| 6,655,735 | B1 * | 12/2003 | Learning .............. | A47C 31/116 297/229 |
| 6,793,636 | B1 | 9/2004 | Pepera | |
| 8,458,051 | B1 | 6/2013 | Saltzman | |
| 2003/0033666 | A1 | 2/2003 | Hutsell | |
| 2007/0033069 | A1 | 2/2007 | Rao | |
| 2007/0100261 | A1 | 5/2007 | Turell | |
| 2007/0112600 | A1 | 5/2007 | Palmer | |

(Continued)

FOREIGN PATENT DOCUMENTS

| | | | | |
|---|---|---|---|---|
| WO | WO-2017207636 A1 * | 12/2017 | ........... | A61F 7/0085 |
| WO | WO-2020018980 A1 * | 1/2020 | ........... | F25D 31/005 |

*Primary Examiner* — Brandy S Lee
*Assistant Examiner* — Rohan Patel
(74) *Attorney, Agent, or Firm* — William H. Quirk; Cassidi D. Banales; Rosenthal Pauerstein Sandoloski Agather, LLP

(57) ABSTRACT

A chair including a massaging roller system and a water temperature control system for providing thermal therapy to a user. The water temperature control system includes a cooler for cooling liquid; a heater for heating liquid; an interior liquid pad configured to be heated and cooled by liquid from the cooler and heater, where the interior liquid pad disposed within the massage chair, and an exterior liquid pad configured to be heated and cooled by liquid from the cooler and heater by a flexible fluid line, where the exterior pad is disposed at an exterior of the massage chair and the flexible fluid line is configured to enable the exterior liquid pad to be moveably positioned on the user's body.

20 Claims, 12 Drawing Sheets

(56) References Cited

U.S. PATENT DOCUMENTS

| | | | | |
|---|---|---|---|---|
| 2008/0030053 | A1* | 2/2008 | Kamba | A61H 1/003 297/354.1 |
| 2008/0039750 | A1* | 2/2008 | Mahmoud | A61H 9/0021 601/55 |
| 2010/0137755 | A1* | 6/2010 | Nagano | A61H 15/00 601/112 |
| 2011/0055720 | A1 | 3/2011 | Potter | |
| 2012/0096637 | A1 | 4/2012 | Laflamme | |
| 2013/0053218 | A1 | 2/2013 | Barker | |
| 2013/0325491 | A1 | 12/2013 | Ferrari | |
| 2014/0067097 | A1 | 3/2014 | Harris | |
| 2015/0278786 | A1* | 10/2015 | Ruggiero | G06Q 50/06 601/99 |
| 2015/0335523 | A1 | 11/2015 | Kang | |
| 2016/0206506 | A1 | 7/2016 | Henkemans | |
| 2018/0021166 | A1* | 1/2018 | Rose | A61H 33/0095 607/104 |
| 2019/0298256 | A1 | 10/2019 | Hunt | |
| 2019/0328576 | A1* | 10/2019 | Lowe | A61F 7/0085 |
| 2020/0170882 | A1* | 6/2020 | Park | A61H 9/0078 |
| 2020/0357046 | A1 | 11/2020 | McGann | |
| 2021/0236365 | A1 | 8/2021 | Zilberman | |
| 2022/0004998 | A1 | 1/2022 | Zhang | |
| 2023/0065151 | A1* | 3/2023 | Huggins | A61F 7/0053 |

* cited by examiner

100

| | Premium Membership | Express Membership | Massage Membership |
|---|---|---|---|
| Massage Sessions | Unlimited | 10 Sessions | 5 Sessions |
| Monthly Pricing | $149 | $89 | $49 |

Fig. 10

RAPID HEATING AND COOLING SYSTEM UTILIZING MECHANICAL AND THERMAL THERAPY

CLAIM OF PRIORITY TO PRIOR APPLICATION

This application claims the benefit of the filing date of U.S. Provisional Application, Ser. No. 63/278,256, filed on Nov. 11, 2021, entitled "A Rapid Heating and Colling Reclining System Utilizing Mechanical and Water Encapsulated Thermal Massaging Therapy". By this reference the entire disclosure, including the claims and drawings, of U.S. Provisional Application, Ser. No. 63/278,256 is hereby incorporated into the present disclosure as though now set forth in its entirety.

BACKGROUND OF THE INVENTION

1. Field of the Invention

The present invention relates generally to apparatus for applying therapeutic effects, and, specifically to an apparatus that utilizes water for applying heating and cooling while providing therapeutic massage.

2. Description of Related Art

The global health and wellness industry is growing rapidly with revenues, according to some estimates, exceeding $2-3 trillion per year. According to surveys conducted by the Centers for Disease Control and Prevention, more than two-thirds of adults in the United States are considered overweight or obese, with more than one-third of adults being considered obese. Yet, despite these market forces, some estimates indicate that less than 20% of the population of the United States is a member of a health club or fitness center. These two overwhelming national statistics, the growth of wellness dollars spent and the continuing growth rate of the overweight/obese populations, underscore the interest and need of people to look and feel better. Unfortunately, convenient and regular access to massage is simply unaffordable to the majority of the population. Additionally, now more than ever, people suffer tension and stress, chronic pain, lack of exercise, and a broad range of conditions which are often best treated with temperature-based therapy and massage.

Segments of the population which either need or often seek information and opportunity for improving personal health and wellness include those people who are overweight or obese, senior citizens, people who are already active and fit, and those people who suffer with chronic pain. Most people fall into one or more of these categories. These key demographics include: an overweight population exceeding 130 million; those purchasing hands-on massage numbering 40 million; active fitness individuals exceeding 35 million in number; chronic pain sufferers being approximately 95 million people; and a senior citizen population of over 40 million, which is the fastest growing population segment.

Often, those who are overweight or obese may feel out of place in a health club and may be too embarrassed or uncomfortable receiving a hands-on massage. Yet, these same people want and need the benefit and results that exercise and massage can deliver. The overweight population is thought to be highly interested in receiving touchless massage due to the discreet nature of privacy as compared to traditional hands-on massage. Interest is also thought to be due to their bodies' response to massage, which is often greater than people who are considered in the normal range of body weight. More tissue and body mass requires additional stimulation during massage to offset some of the complications that accompanies extra weight. Additionally, scientific studies have concluded that one of the body's first and natural response to cold is to begin burning fat tissue. Which has led to the rise in popularity in specialized cold therapy, or cryotherapy for weight loss applications.

Senior citizens represent a large and growing segment of the population. More and more seniors are actively seeking information about how to improve mobility and achieve better health. Delivery of concise and accurate information, as well as the provision of helpful and needed services, can help seniors better understand how their health and bodies change over time.

Active people are more likely to know and understand the benefit of massage, exercise and nutrition and the role that each play in maintaining a healthful and more enjoyable lifestyle. Such people who already care enough to exercise are more likely to be inclined to want to enhance their fitness goals with the systems and methods disclosed herein.

Health and wellness services, most particularly the type of temperature-based and massage therapy which is a substantial component of the system and methods herein described, is especially meaningful with respect to a number of chronic pain conditions due to the analgesic benefits of penetrating heat and deep tissue massage. In many instances, people who suffer from chronic pain are prescribed massage as a therapy or treatment as a method for relieving the pain. Leading healthcare professionals generally agree that massage not only feels good but is very beneficial to a person's overall health.

Traditional massage chairs offer all of the above benefits, but they can be problematic for some users. Often, the hard or softer foam rollers used in traditional massage chairs can be too painful for some. Additionally, over 90% of the massage chairs on the market contain bacteria collecting folds and cavities on the surface on which the user sits. These folds and cavities can be virtually impossible to properly clean and unsanitary in a commercial environment.

Massage is a critical factor for the majority of people for achieving and maintaining better health. Moreover, the effects of a one-hour hands-on massage can be felt in as little as a 15-minute therapeutic massage chair session. There is a need for having a system that can combine heating or cooling rapidly into an integrated unit, while offering the benefit of a massage simultaneously.

BRIEF SUMMARY OF THE INVENTION

Disclosed embodiments are enabled to provide temperature-based therapy by the use of water filled pads that are both within the chair and externally placed on or around the user. Additionally, encapsulated water, air, or mechanical massage is applied to the user in a manner which is less painful and more comfortable than existing devices.

To those ends, among others, the disclosed embodiments include water-filled pads, that can be either rapidly heated or cooled to aid in recovery after an injury or physical activity. Embodiments include pads both internally within the chair and externally that are placed over or around the user. In some embodiments, the temperature of the water within the pads can rapidly change from 35 to over 100 degrees Fahrenheit in approximately 60 seconds.

Disclosed embodiments include a means for providing a less painful massaging experience to the user with the use of air, water-filled, or mechanical rollers within the chair. Further embodiments could include airbags that can be used independently or in combination with the roller system. Embodiments of the disclosed invention provide tolerable, comfortable, and optimal therapy to the body of the user.

Disclosed embodiments further include a smooth surface that is sanitary and easily cleaned. To achieve this, disclosed embodiments only have stitching on areas of the chair system that do not contact the user's body. Accordingly, areas of the chair that users contact include a smooth bacteria-resistant surface that can be easily cleaned and sanitized by wiping down.

In addition to those features mentioned above, disclosed embodiments may include components that provide the ability to simultaneously massage the legs of the user of the massage chair. Some preferred embodiments incorporate a leg section as part of the disclosed massage chair to perform either percussion or vibration massage to the user's legs based on the user's preference or need.

Disclosed embodiments of the massage chair include proprietary software programs that enable manipulation of the roller system such that the roller system provides a unique wave pattern. More particularly, disclosed embodiments of the massage chair deviate from the traditional wide back and forth sweeping motion that cross over many muscle fibers causing irritation, that is used in many existing massage chairs. Instead, the disclosed embodiments use a much narrower pass that mimics more of a human hand providing the massage, providing a less painful and more enjoyable massage for the user.

Another object of the present invention is to offer a massage chair that is both convenient and cost effective for business owners to charge clients to use. In some preferred embodiments, software is implemented into the massage chair to allow the owner to establish the time for use, price of the session, and frequency of massage.

Various embodiments of this disclosure relate to a massage chair including a chair body having a chair back, a chair seat, and a leg section. The massage chair further includes a roller system comprising a plurality of massaging rollers and positioned within at least one of the chair back, the chair seat, and the leg section. The massage chair further includes a water temperature control system for providing thermal therapy to a user, comprising: a cool tank for storing cooled liquid cooled by the system; a heat tank for storing heated liquid heated by the system; an interior liquid pad fluidly coupled with the cool tank and the hot tank and configured to be heated and cooled by liquid from the cool tank and heat tank, the interior liquid pad disposed within one of the chair back, the chair seat, the leg section, and an exterior liquid pad fluidly coupled with the cool tank and the hot tank by a flexible fluid line and configured to be heated and cooled by liquid from the cool tank and heat tank, wherein the exterior pad is disposed at an exterior of the massage chair and the flexible fluid line is configured to enable the exterior liquid pad to be moveably positioned on the user's body. The massage chair further includes an attached display configured to present control options to the user for operating the water temperature control system and the roller system and control the systems based on inputs received from the user.

It is also contemplated that the massage chair will be full-featured and include features such as zero gravity, full recline, heat, auto-sensing controls, and multiple massage programs.

The disclosure, including descriptions, drawings, and claims, describes one or more embodiments of the invention. Many other features, objects, and advantages of the invention will be apparent to one of ordinary skill in the art from the disclosure. Given the disclosure, especially in light of the prior art, it is another object of the invention to improve upon, and overcome the inefficiencies, limitations, and constraints of, the prior art.

BRIEF DESCRIPTION OF THE DRAWINGS

FIG. 10 is a chart showing one non-limiting example of a membership pricing structure.

DETAILED DESCRIPTION OF PREFERRED EMBODIMENTS

Figure 1:
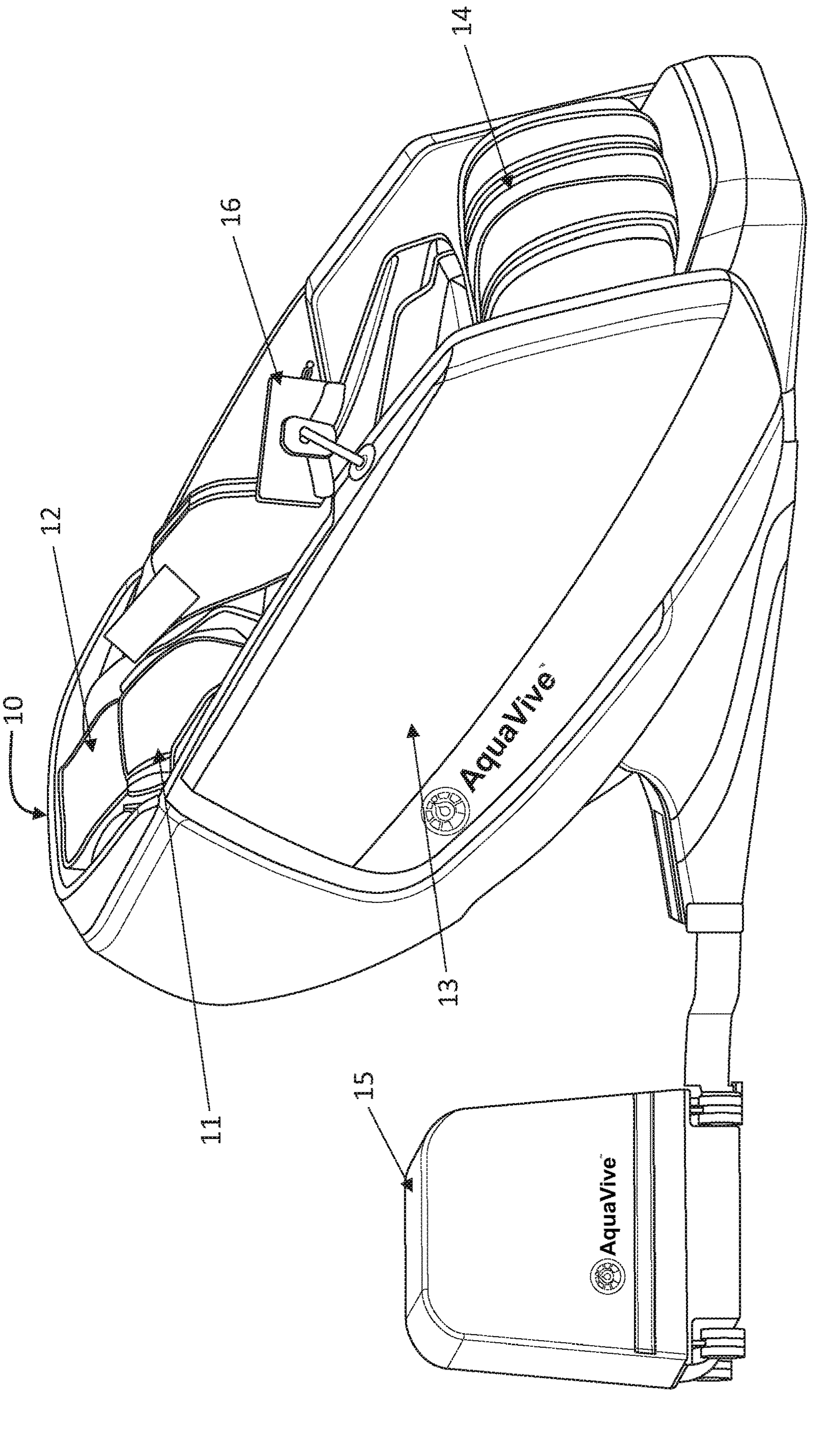
FIG. 1 illustrates a preferred embodiment showing the therapeutic massage chair 10.

The disclosures of this patent application, including the descriptions, drawings, and claims, describe one or more embodiments of the invention in more detail. Many other features, objects, and advantages of the invention will be apparent from these disclosures to one of ordinary skill in the art, especially when considered in light of a more exhaustive understanding of the numerous difficulties and challenges faced by the art. While there are many alternative variations, modifications and substitutions within the scope of the invention, one of ordinary skill in the art should consider the scope of the invention from a review of any claims that may be appended to applications and patents based hereon, including any amendments made to those claims in the course of prosecuting this and related applications.

Therapeutic Massage Chair

Preferred embodiments of the present invention involve a temperature-based therapeutic massage chair 10 implementing the provision of adjustable temperature and massage to the body of the user. Embodiments will provide temperature-based therapies by offering a dynamic range of temperatures that can easily and quickly be adjusted from about 40 to over 90 degrees Fahrenheit. In addition to the rapid temperature control, for temperature-based therapies, such as heat-based therapy for muscle recovery or cold temperature benefits like weight loss, the apparatus 10 will offer several therapeutic effects.

Preferred embodiments of the therapeutic massage chair 10 will provide a more comfortable form of massage that is accessible to more users. The benefits of hydrotherapy massage include, but are not limited to, pain reduction, lymphatic stimulation, improved circulation, relaxation, and reduced stress. Despite the numerous benefits associated with traditional massage chairs, they are often not used due to pain or discomfort experienced by some users.

The present invention 10 appeals to those segments of the population who experience pain from use of traditional massage chairs, and who therefore would likely avoid use otherwise. Preferred embodiments of the present invention alleviate the issue of hesitancy to experience the therapeutic effect of massage chairs because of the perception that such devices cause pain to the user. The features that will be described in detail below combine to offer a less painful experience for the user.

In contrast to the hard or soft foam rollers used in traditional massage chairs, preferred embodiments of the rollers 20 in the massage chair 10 allow greater surface contact between the roller and the user. Preferred embodiments of the rollers 20 disperse pressure as they make contact with the user's body, allowing a more enjoyable experience. Additionally, the rollers 20 will mimic more of the feel of a human hand and varying the pressure of the rollers 20 will allow differing levels of softness and feel. As a result, the user of the massage chair 10 experiences a less painful and more customizable massage in contrast to prior massage chair designs.

Turning to FIG. 1, there is shown a preferred embodiment of the therapeutic chair 10. The chair incorporates a flat surface 12 that has no exposed seams, is moisture proof, and is preferably treated with an anti-bacterial additive. The flat surface 12 allows a user or operator to quickly and effectively clean the part of the massage chair 10 that directly touches the body of users in a commercial environment. As those persons skilled in the art will readily recognize, the combination of an anti-bacterial inhibitor and the elimination of folds and cavities on the massage chair surface 12 discourages harmful germ growth on massage chair 10. As a result, the massage chair 10 is more sanitary and easier to clean for owners than massage chair designs that do contain exposed seams or bacteria trapping folds and cavities.

Preferred embodiments of the massage chair 10 incorporate a chair back 11, a chair seat 13, and a leg section 14. The leg section 14 is capable of applying a customizable massage to the legs of the user. The leg section 14 of the massage chair 10 will contain a mechanism that can either perform a vibration or a powerful tapping-like massage to the user's legs. The leg section 14 will have a flat surface 12, providing the benefits previously described above.

Preferred embodiments of the apparatus 10 may incorporate an input device, such as touchscreen 16 or mobile device connected or in proximity to massage chair 10 for interacting with and operating the system for controlling functional aspects of massage chair 10. In some embodiments of massage chair 10, the touchscreen 16 is mounted to allow a user of massage chair 10 to intuitively interact with a touchscreen 16 or mobile device while seated in massage chair 10 and receiving massage and temperature-based therapy. The input device may be connected to a network that can transmit and store the user data and preferences between uses. Also seen in FIG. 1 is the attached water temperature control system housing 15 which houses the water temperature control system 600 (Described in detail in FIGS. 6A and 6B).

Figure 2B:
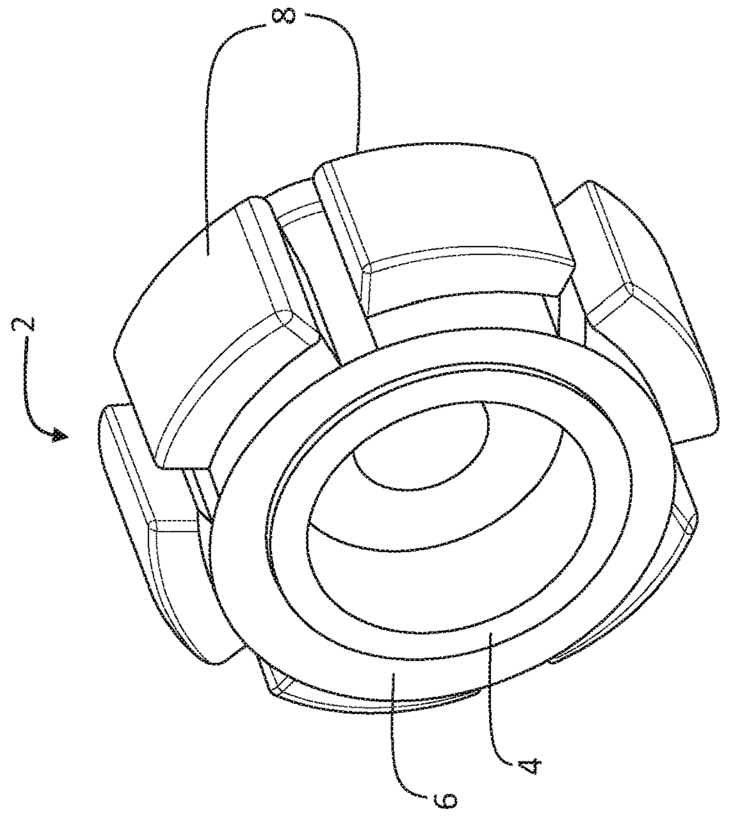
FIG. 2B illustrates another embodiment of a massage roller.
Figure 2A:
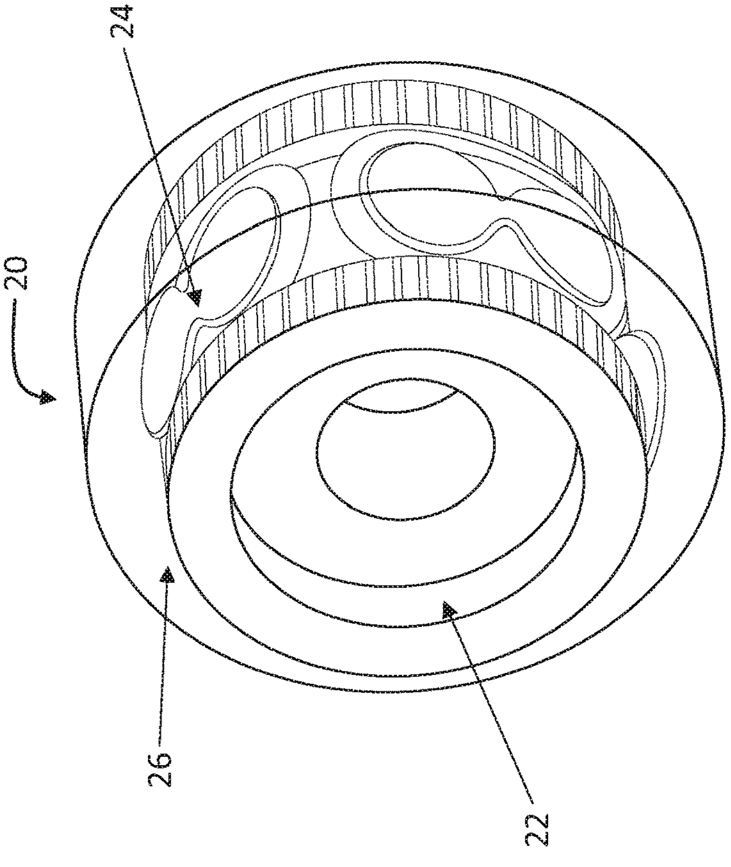
FIG. 2A illustrates one embodiment of the massage rollers 20 including an inner roller 22, inner water packs 24, and outer protective ring 26.

As seen in FIG. 2A, the chair 10 incorporate the use of massaging rollers 20. Preferred embodiments of the rollers 20 include a thermoplastic elastomer ("TPE") or silicone inner roller 22, inner water packs 24 constructed of a thermoplastic polyurethane ("TPU") material, and a TPE or silicone outer protective ring 26. Other embodiments of the rollers 20 can be a foam or other materials to achieve the same effect. The use of water packs 24 within the roller 20 alleviate the sometimes painful experience users experience with the use of traditional rollers and produces a more comfortable massage. In other embodiments, as shown in FIG. 2B, chair 10 incorporates a plurality of roller 2, which comprises an inner roller 4, an outer roller 6 disposed around inner roller 4, and a plurality of liquid packs 8 disposed around the outer-facing surface of outer roller 6. In some embodiments, inner roller 4 comprises plastic, TPE, silicone, or a hard foam; and outer roller 6 comprises a softer material, such as a soft foam. Water packs 8 can be made of a pliable or malleable plastic, such as TPU, for example, which encloses a liquid. For example, water packs 8 can hold a water, gel, or gelatinous material.

Figure 3A:
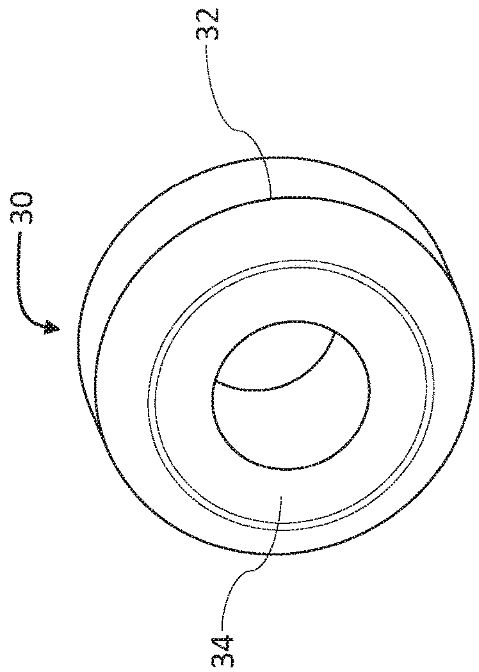
FIGS. 3A & 3B depict one embodiment of the massaging rollers 30 including a cylindrical water-filled wrap 32 over a foam inner roller 34.
Figure 3B:
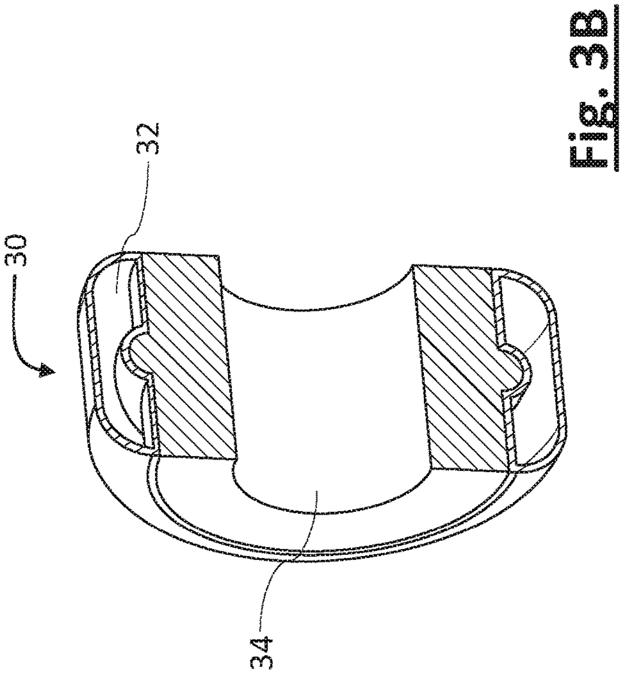
Figure 4A:
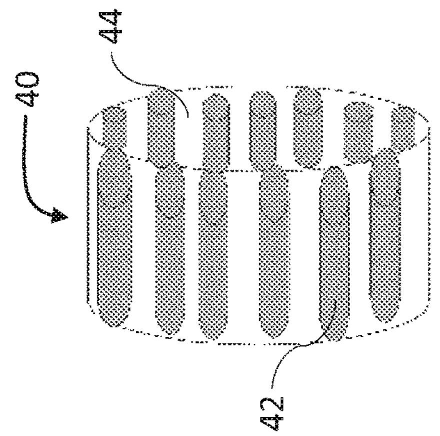
FIGS. 4A & 4B illustrate another embodiment of the massaging rollers 40 with water filled inserts 42 placed around the exterior perimeter of a foam inner roller 44.
Figure 4B:
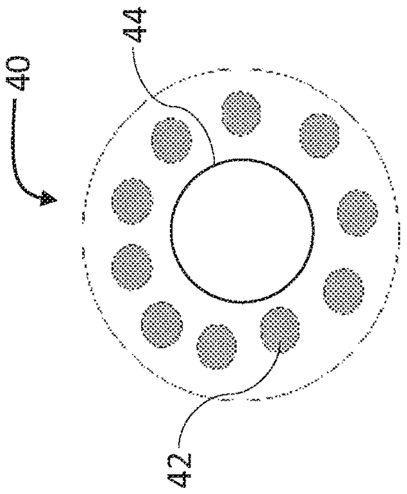

As seen in FIGS. 3A-3B, some preferred embodiments of the apparatus 10 incorporate the use of massaging rollers 30 with a liquid chamber 32 placed around the exterior perimeter of an inner roller 34. Some embodiments of the massage chair 10 incorporate the use of massaging rollers 40 with water filled inserts 42 placed around the exterior perimeter of a foam inner 44, as seen in FIGS. 4A-4B.

The embodiments described are one of many examples that could be utilized in the apparatus 10. Those skilled in the art will recognize that many different materials or configurations could be used. In particular, the use of water in the inserts or within the water packs 8, 24, 32, 42 in the roller can be filled with a variety of liquid or gelatinous material to achieve the same effect. Additionally, rollers 4, 6, 22, 34, 44 can be made from or comprise any of a number of materials, such as foam, TPE, or silicone.

Temperature-Based Therapy

Figure 5B:
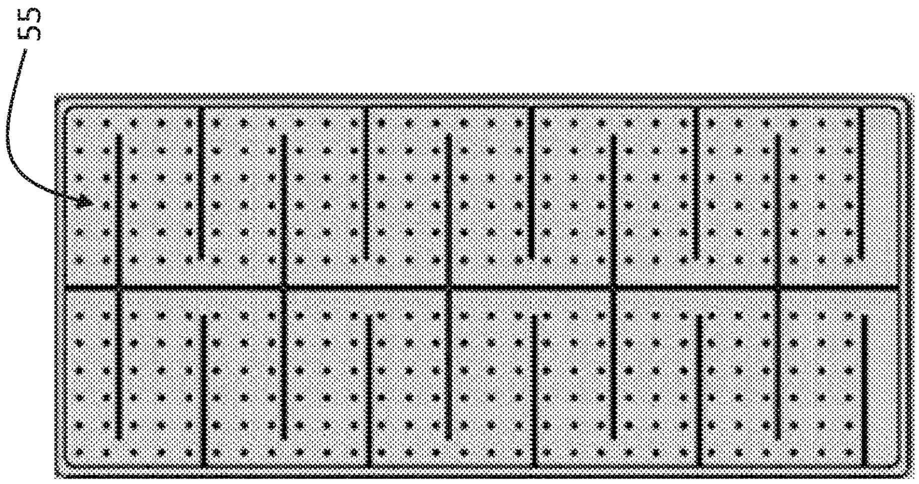
FIGS. 5A & 5B illustrate embodiments of a water-filled heating and cooling pad 50 that may be incorporated into any of the disclosed embodiments of the chair 10.
Figure 5A:
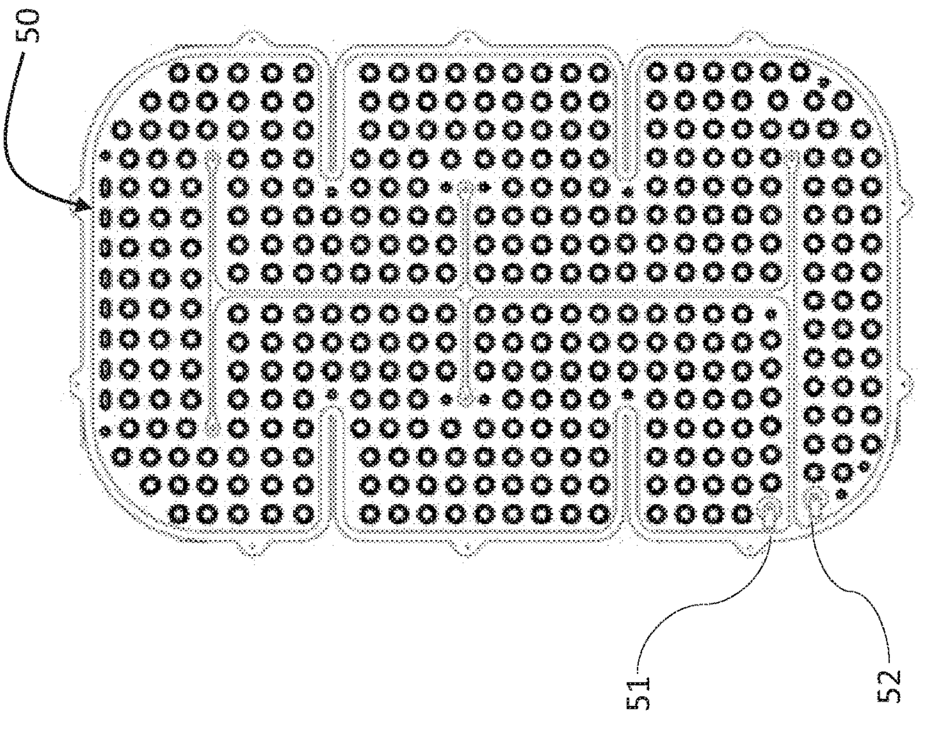

Turning to FIGS. 5A & 5B, which shows embodiments of a liquid pads 50, 55 within the chair that can rapidly heat or cool the user. In preferred embodiments of pad 50, water enters the inlet 51 and is circulated through the pad 50 and flows through the outlet 52. Similarly, pad 55 has a water inlet and outlet for circulating water through the pad 55. The pads 50 are rapidly cooled or heated through a series of water ducts incorporated within. Embodiments of the water-filled pad 50, 55 can change temperature rapidly, they can increase in temperature from about 35 degrees to over 100 degrees Fahrenheit in approximately 60 seconds. Inversely, water-filled pad 50, 55 can cool to about 35 degrees from over 100 degrees Fahrenheit in the same amount of time. Those with skill in the art will understand that pad 50 and pad 55 are simply two different embodiments of and that either can be disposed within the chair 10. Accordingly, throughout the current disclosure, it will be understood that any description of pad 50 can be applied to pad 55 and vice versa.

The water temperature in the water-filed pads 50 incorporated in the massage chair 10 has a therapeutic effect for the user, and can be customized. Using cold water in the pads 50 offer therapeutic effects such as recovery from injuries. Cold based therapy also has the benefit of causing the user to shiver which promotes weight loss in the individual. Heat based therapy can aid in recovering from muscle fatigue and offers a comfortable environment for the user while receiving a massage from the apparatus 10. It should be noted that the exact temperatures provided are merely for example to illustrate the rapid temperature changing technology incorporated in the water-filled pads, and various temperatures can be achieved in relatively the same amount of time.

The temperature-controlled massaging applies heating or chilling to the body's microclimate. Temperature-based therapy provides benefit to active users before a workout by increasing their range of motion, improving flexibility, improving blood flow to the body, and by reducing the chance of injury. Additionally, the apparatus 10 can provide benefits post workout by aiding in flushing lactic acid from the body, lowering core body temperature rapidly, and relaxing and calming the body.

Figure 6A:
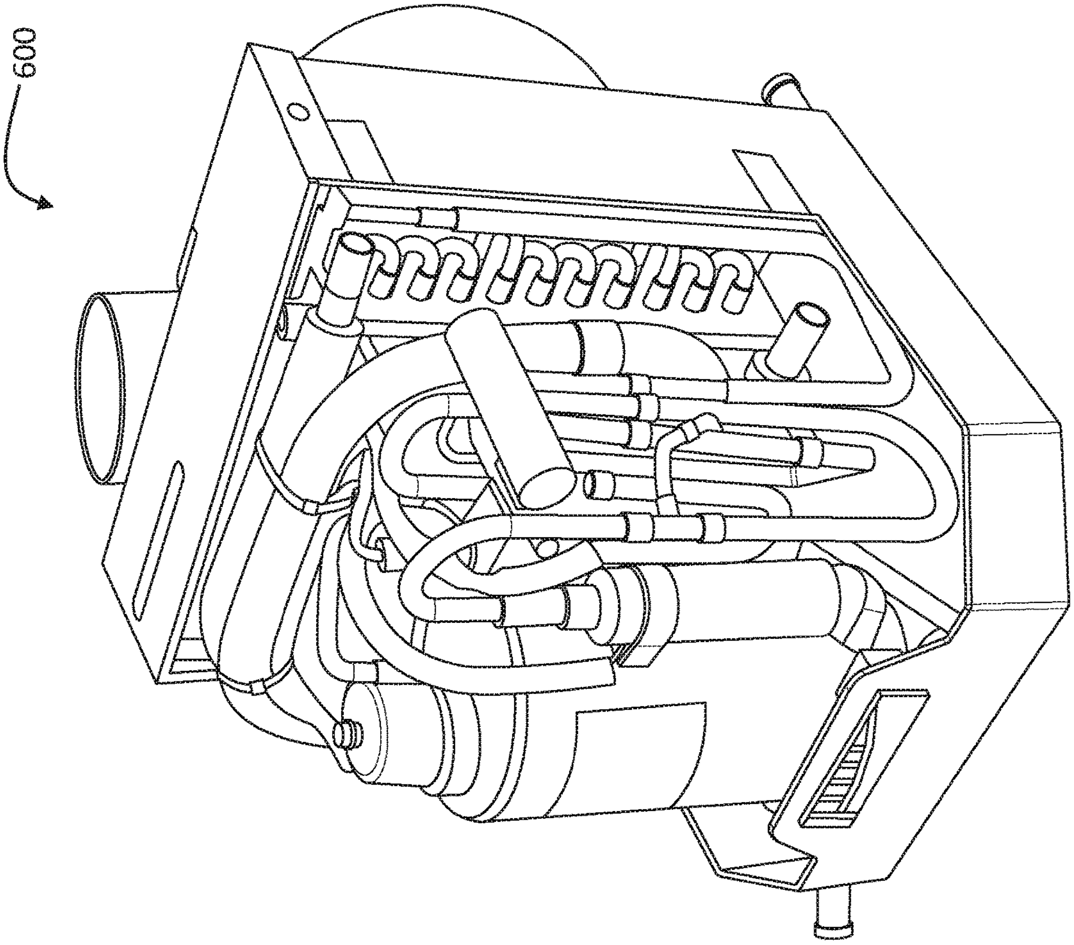
FIG. 6A illustrates an embodiment of the water temperature control system.

Turning to FIG. 6A, which illustrates an embodiment of the water temperature control system 600. Embodiments of the water temperature control system 600 holds 7 gallons of water, preferably distilled. Those skilled in the art will understand that the water temperature control system 600 can take the form of different configurations, size, shapes, and different water volume capacities.

Figure 6B:
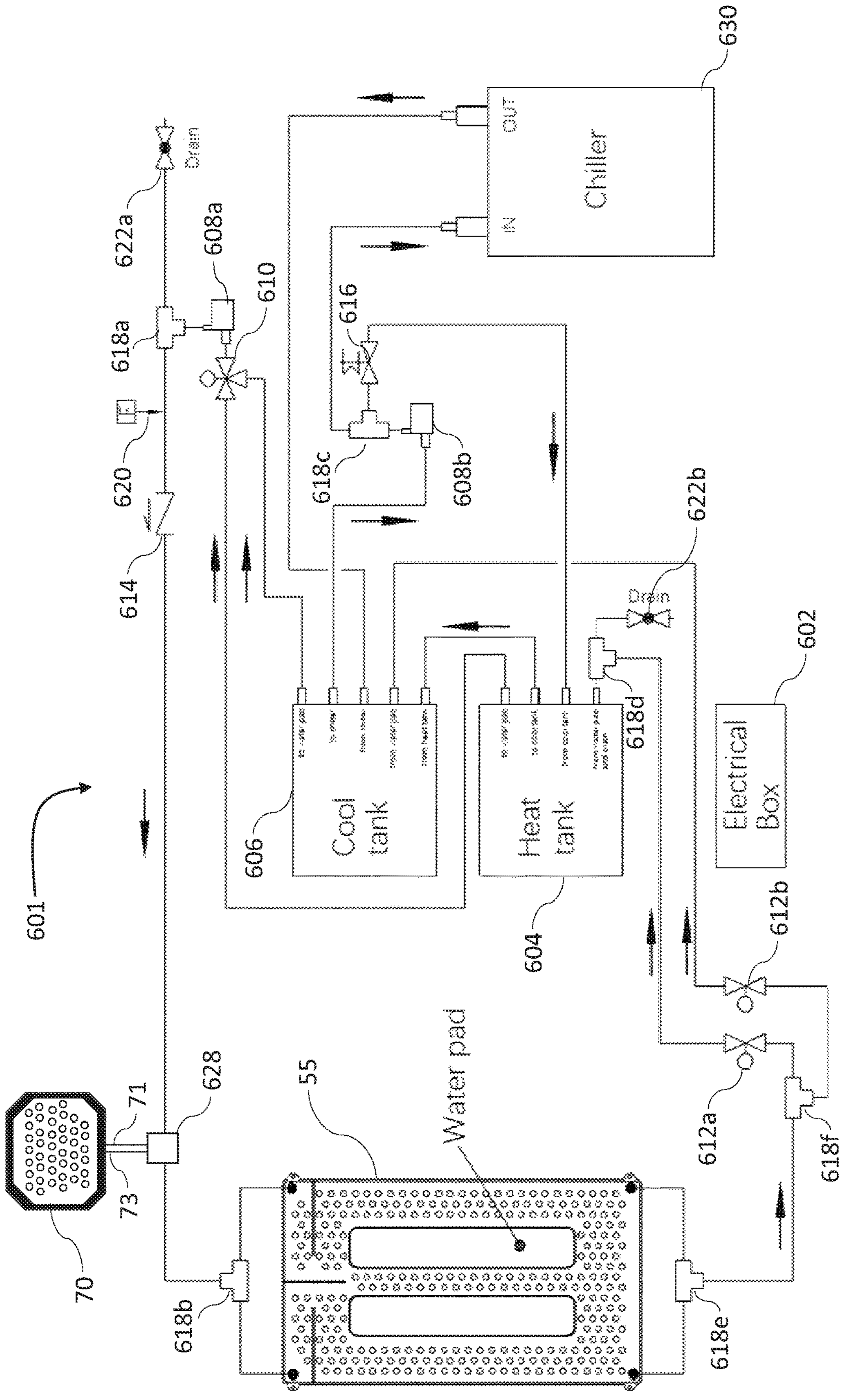
FIG. 6B is a schematic view of an embodiment of the water temperature control system.

Turning to FIG. 6B, which shows the schematic 601 for an embodiment of the water temperature control system 600. Although system 600 is described as heating and cooling water, those with skill in the art will understand that working liquids other than water may be incorporated into system 600, such as coolant or refrigerants, for example. Components include the water-filled pad 55, electrical box 602 to power the system, heat tank 604, cool tank 606, and chiller 630. The water-filled pad 55 is embedded in the chair in either the chair back 11, chair seat 13, or leg section 14, or in multiple sections. Water is circulated and regulated by small pumps 608*a* & 608*b* and is circulated through a heating tank 604 and a cooling tank 606. In some embodiments, water of the system is cooled by chiller 630 and delivered to cool tank 606 to be stored for use by the system. In some embodiments, heat tank 604 includes a heater configured to heat water stored therein for use by the system. Accordingly, water chiller 630 and cool tank 606 can be referred to herein as a water cooler and heat tank 604 can be referred to as a water heater. In other embodiments, a variety of heating and cooling methods can be used in a water temperature control system 600 to achieve the same results, such as with the use of coils, cylinders, or a "flow-through" circulated heating method as seen in modern tankless water heaters. Accordingly, in various embodiments of this disclosure, tanks 606 and 604 are replaced with a flow-through heater and/or cooler such that tanks for storing heated and/or cooled liquid is not needed.

As previously discussed, in some embodiments the chiller 630 is configured to cool water to 35 degrees Fahrenheit and the heat tank 604 is configured to heat water of the system to more than 100 degrees Fahrenheit. Electric three-way valve 610, electric two-way valves 612*a* & 612*b*, check valve 614, solenoid valve 616, T-joints 618*a*-618*f*, and row switch 620 connect the hoses and direct water to the appropriate areas. Water from the system is released through drains with ball valves 622*a* & 622*b*.

Additional external pads 70 (described in detail in FIG. 7) can be attached directly to the water system and can be placed on different areas of the user's body during use of the massage chair 10. Externals pads 70 are connected to the system with a water inlet tube 71 and outlet tube 73. The flow of water through the temperature control system 600 is indicated by the various flow arrows illustrated in FIG. 6. According to some embodiments, exterior pad 70 and interior pad 55 are fluidly coupled in series with heat tank 604 and cool tank 606. As depicted in FIG. 6, in some embodiments, exterior pad 70 is disposed upstream of interior pad 50. However, in other embodiments, interior pad 50 is disposed upstream of exterior pad 70. Additionally, in other embodiments, those with skill in the art will understand that system only includes an interior pad 50 and does not include an exterior pad 70.

Additionally, in other embodiments, that system 600 includes a plurality of interior pads 55 and, in some embodiments, each pad 55 is disposed in a different section 11, 13, 14 of chair 10. Similarly, multiple moveably placeable pads 70 on the user's body. Those skilled in the art will recognize that the schematic in FIG. 6 represents one embodiment, and other components or combination of components can be assembled in alternative methods to achieve the same effect, including the number of water pads 55, 70 included in the water temperature control system 600.

Figure 6C:
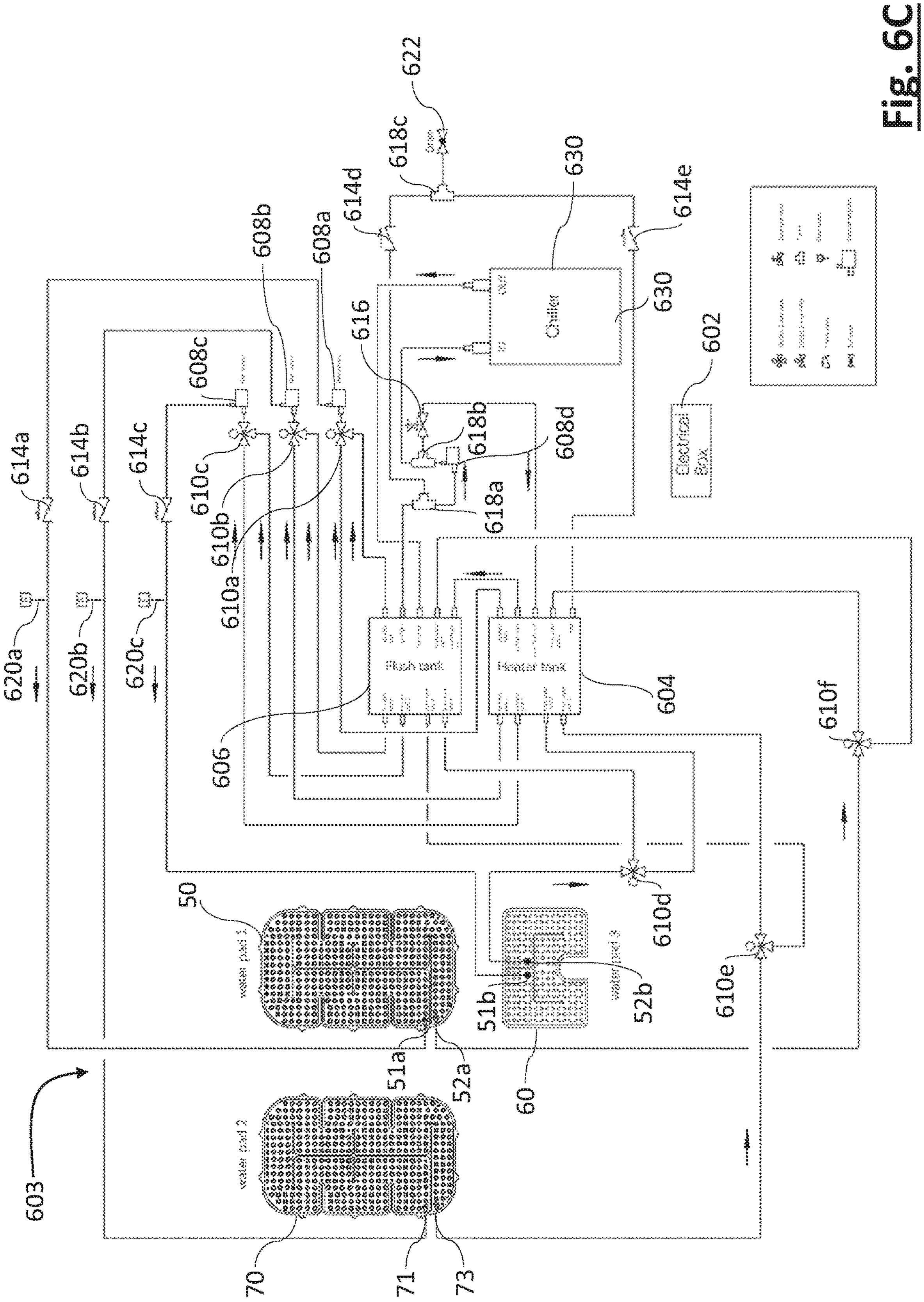
FIG. 6C is a schematic view of another embodiment of the water temperature control system.

Turning to FIG. 6C, which shows the schematic 603 for an embodiment of the water temperature control system 600. Although system 603 is described as heating and cooling water, those with skill in the art will understand that working liquids other than water may be incorporated into system 603, such as coolant or refrigerants, for example. Components include the water-filled pad 50, leg section water pad 60, external pad 70, electrical box 602 to power the system, heat tank 604, cool tank 606, and chiller 630. As discussed with system 600, according to various embodiments, system 603 incorporates flow-through type water heaters and/or coolers rather than tanks for heated and/or cooled water. The water-filled pad 50 is embedded in the chair in either the chair back 11 or chair seat 13, or pad 50 can span into both the chair back 11 and the seat 13. In some embodiments, there are multiple pads 50; for example, one pad can be disposed in the chair back 11 and another can be disposed in the chair seat 13. The dedicated leg section pad 60 is within the leg section 14 of the chair 10. Leg section pad 60 is substantially similar to pad 50 previously described, but is geometrically shaped for disposition within the leg section 14. Water pads 50 and 60 are described as "interior" pads, as they are disposed within chair 10; while pad 70 is described as an "exterior" pad, as pad 70 is disposed outside of chair so that it can be moveably placed on a user's body. Water is circulated and regulated by small pumps 608*a*-608*d* and is circulated through a heating tank 604 and a cooling tank 606. Electric three-way valves 610*a*-610*f*, check valves 614*a*-614*e*, solenoid valve 616, T-joints 618*a*-618*c*, and row switches 620*a*-620*c* connect the hoses and direct water to the appropriate areas. Water from the system is released or recirculated through drain with ball valve 622.

Water flows through the water pad 50 through the inlet 51*a* and is returned to the system 600 through the outlet 52*a*. Similarly, for the leg section pad 60 water enters through the inlet 51*b* and is returned through the outlet 52*b*, and water enters the inlet 71 and exits the through the outlet 73 after it circulates through the external pad 70. In embodiments with this configuration, the water temperature control system 600 can individually and separately heat and cool each of the water pad 50, leg section pad 60, and external pad 70 concurrently. As illustrated, pads 50, 60, 70 are coupled with the heat and cool tanks 604, 606 in parallel (as opposed to in series), which allows for independent water flow control from the tanks 604, 606 to each of the pads 50, 60, 70. As shown, pad 50 is coupled to tanks 606, 604 by valve 610*a* and pump 608*a*; pad 60 is coupled to tanks 606, 604 by valve 610*c* and pump 608*c*; and pad 70 is coupled to tanks 606, 604 by valve 610*b* and pump 608*b*. Accordingly, by controlling operation of pumps 608*a*-608*c* and/or valves 610*a*-610*c*, the system 603 is able to independently control water supply (and thus temperature) from tanks 604, 606 to each pad 50, 60, 70. This independent temperature control of the pads 50, 60, 70 offers a user an enhanced therapeutic experience. For example, a user can utilize one temperature for the water pad 50, a cooler temperature for the leg section pad 60, and a higher temperature for the external pad 70 all at the same time. Control of the valves and pumps of system 603, 600 described herein is achieved by electrical box 602 in display 16. Specifically, a user can provide input settings at touchscreen display 16 and the inputs can provide operation instruction to electrical box 602 for controlling the pump and valves of system 603, 600 to provide for the desired settings entered by the user.

Those skilled in the art will recognize that the schematic in FIG. 6C represents one embodiment, and other components or combination of components can be assembled in alternative methods and configurations to achieve the same effect, including the locations and number of water pads 50, 60, 70 connected in parallel and methods for heating and cooling the liquid in the water temperature control system 603.

Figure 7:
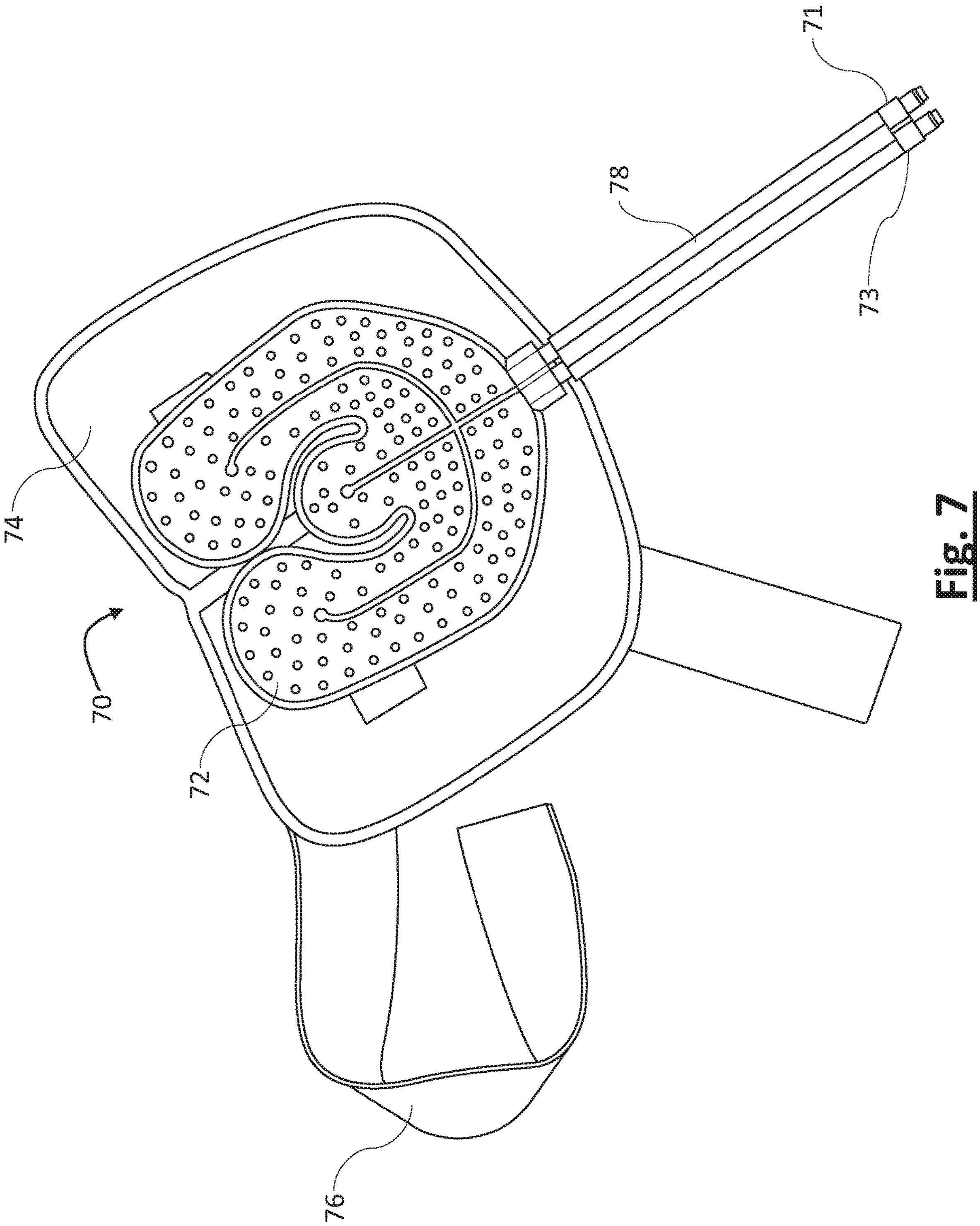
FIG. 7 illustrates a preferred embodiment of an external water pad.

Turning now to FIG. 7, which illustrates an embodiment of an external liquid pad 70. The system allows for one or multiple external pads 70 to be attached and placed on various places on the user's body during use of the chair 10. In this embodiment, warm or cold water is brought from the heat tank 604 or cool tank 606 to the external pad 70 through a flexible tube 78 which houses an inlet tube 71 and outlet tube 73 which securely attaches to the temperature control system 600. Water from the heat tank 604 or cool tank 606 is circulated through the entire inner bladder 72 which is in contact with the user to provide temperature-based therapy and returned to the system. An outer layer 74 with elastic straps 76 surrounds the inner bladder 72 to secure the inner bladder 72 to the portion of the body receiving treatment. Water that has been circulated through the inner bladder 74 is returned to the temperature control system 600 through the outlet tube 73. A flexible tube 78, which includes the inlet and outlet tubes 71, 73, couples pad 70 with the rest of the system 600 and is a long tube and flexible enough such that pad 70 can be moveably positioned by the user to be placed anywhere on the user's body. Embodiments of the chair 10 have external pads 70 that are in a blanket like configuration and are draped over the individual's entire body while using the chair 10. Those skilled in the art will recognize that the external water pad 70 illustrated in FIG. 7 is for illustrative purposes and different configurations of the external water-pad 70 including different shapes, sizes, materials, and components can be used to achieve the same effect.

Figure 8A:
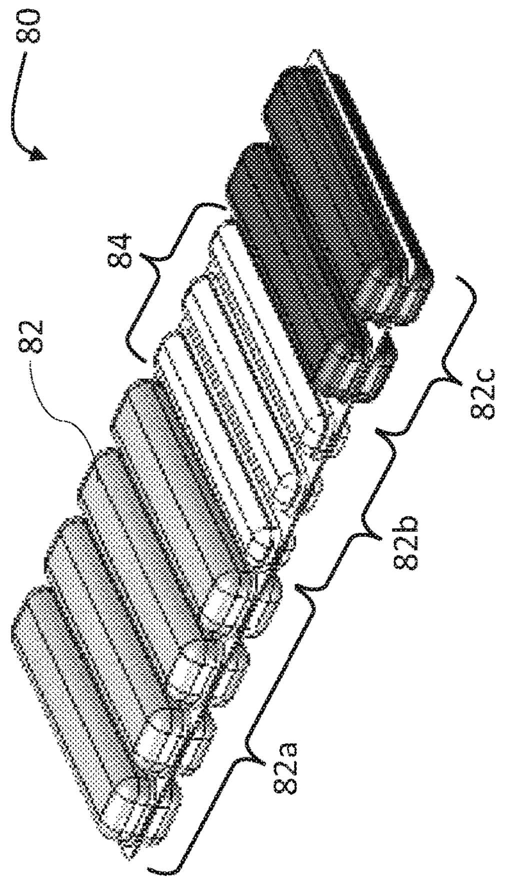
FIGS. 8A & 8B illustrate one embodiment of the massage intensity regulation chambers 80 having individual adjustable bladders 82.
Figure 8B:
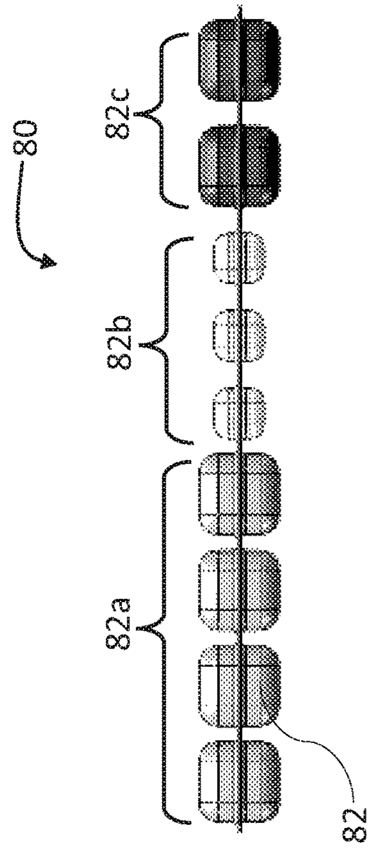

Turning now to FIGS. 8A-8B, in preferred embodiments regulation chambers 80 allow the massage chair 10 to accommodate a variety of body builds or types in a single chair system. Regulation chambers 80 are positioned in the back portion of massage chair 10. Users can inflate or deflate three sections 82*a-c* of bladders 82 to enable the bladders 82 to conform to their body, providing a more comfortable and less painful massage. The center portion 82*b* of the regulation chambers 80 is thinner to provide a more consistent massage. The center portion 82*b* of the regulation chambers 80 accommodates the curvature of the spine and gives the needed support to the lower back of the user. The regulation chambers 80 incorporated into the apparatus 10 furthers the objective of providing a less intense massage experience to the user by offsetting pressure caused by the body weight of the user. Regulation chambers 80 can be incorporated in the leg section to provide a constricting therapy to the user's legs. Those skilled in the art should recognize that the regulation chambers 80 shown is for illustrative purposes and different configurations of the regulation chambers 80 including different shapes, sizes, materials, and number of air bladders can be used to achieve the same effect.

Additional Features

It is also contemplated that the massage chair 10 will be full-featured and incorporate desirable features such as zero gravity, full recline, auto-sensing controls, and multiple massage programs.

Figure 9:
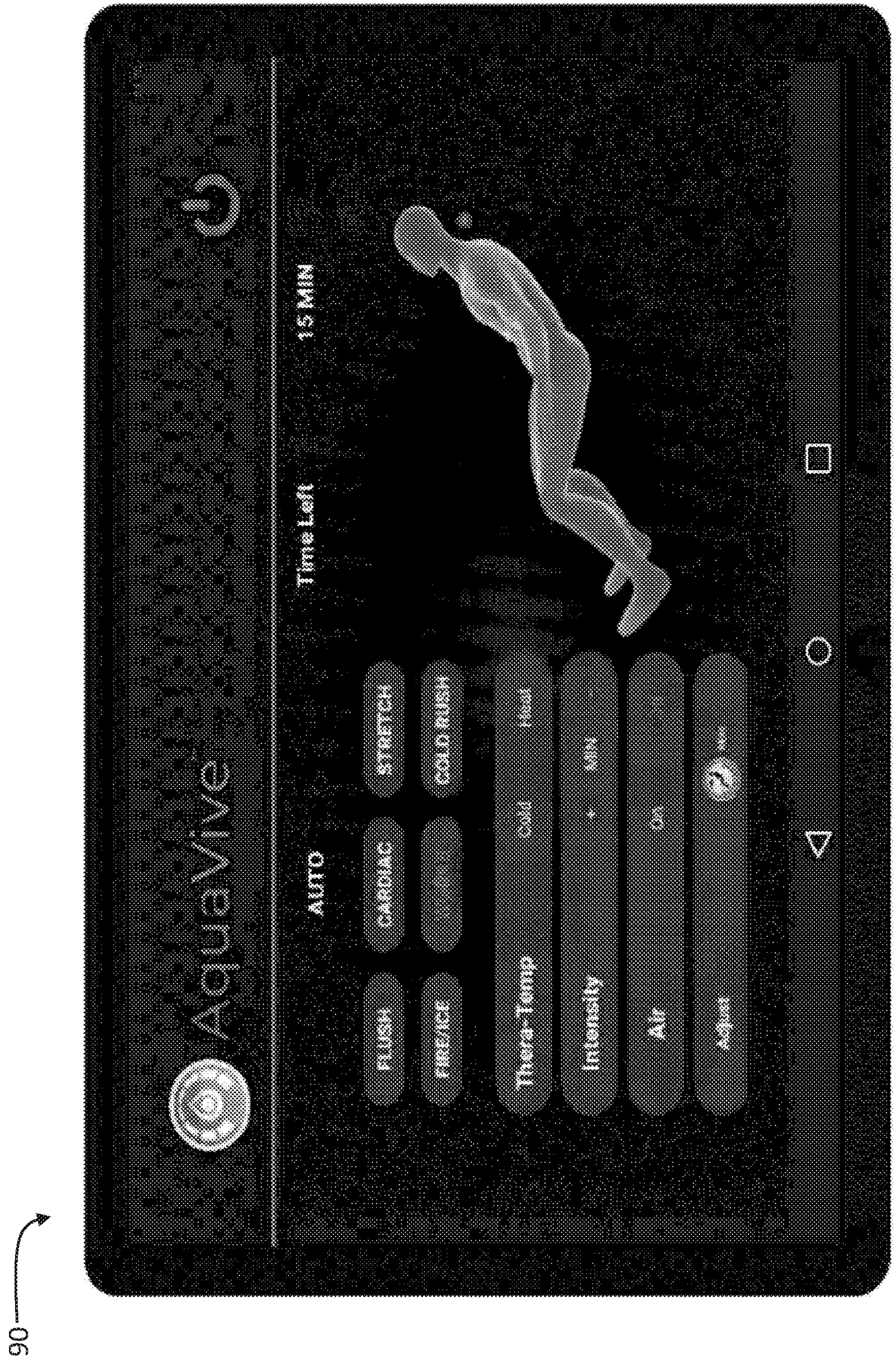
FIG. 9 illustrates screenshots of an example chair control menu 90 as it would appear on an attached touchscreen or mobile device.

Referring now to FIG. 9, there is shown a screenshot of a control menu screen 90 exhibiting various options for a user wherein the user is able to customize the water and air adjustable massage experience and to interact with and operate the massage chair 10. The user has the ability to select various options for a water and air adjustable massage through the course of accessible menus presented on touchscreen 16. At the outset, as will be understood by those of ordinary skill in the relevant art, the menu display as shown is merely for illustrative purposes only and are only examples of a preferred embodiment of the apparatus 10.

As shown on the example chair control menu screen 90 for the touchscreen 16 as illustrated in the example of FIG. 9, there are icons for modifying the massage therapy during the receipt of treatment. For example, there are a number of pre-programed options displayed for the user to intuitively select for the desired therapeutic effect in this example screen 90, such options include: "Flush", "Cardiac", "Stretch", "Fire/Ice", "Works", and "Cold Rush". Additionally, the user can customize the temperature, intensity, toggle air options, or adjust the duration with the push of a button. Further, the example screen 90 displays the time left in the treatment and the areas targeted by the apparatus 10. It is contemplated that users can further customize which portions are targeted on their body and the recline position of apparatus 10.

More particularly, it is contemplated that customers can, among other things, use the touchscreen 16 to order services, customize the massage, or select specific areas they wish to have massaged, as described in further detail below. It is also contemplated that the water and air adjustable massage chair 10 will implement similar methods for allowing a smartphone software application or through a secure web-based portal, to interface with the massage chair 10 in the same manner as a touchscreen 16.

Other facets of operating the massage chair 10 may be represented in other embodiments. Any such alternate displays are intended to be within the scope of the present disclosure.

Preferred embodiments of massage chair 10 incorporate software to manipulate the roller system in a manner that mimics more closely the feel of a human hand performing a trigger point massage. Trigger point massages are best suited for people who have injuries, chronic pain, or a specific issue or condition. Sometimes areas of tightness in the muscle tissues, known as trigger points, can cause pain in other parts of the body. By concentrating pressure to trigger points, this type of massage can reduce pain. In contrast to the back and forth kneading motion that is approximately 4 inches wide, the software enables a user to manipulate the water filled rollers 20 of massage chair 10 to employ a much narrower pass if the user desires.

Preferred embodiments of the apparatus 10 have the ability to easily provide the massage services to users within a commercial environment. The software provides the owner information and control of the massage chair 10. Such information includes but is not limited to, the price of the individual session, and the frequency of massage for the user. Additionally, the incorporated software will allow individual memberships to be established wherein a member remits periodic payments for access to massage chair 10 in addition to various other services and products offered, as described in further detail below.

Some embodiments of massage chair 10 also consider it can be offered in a commercial environment with various services and products in which are offered within the context of the same membership structure. These services and products may also be obtained as separately priced items outside of the membership program by those who choose not to secure a membership.

An example of a membership pricing structure is shown as a chart 100 in FIG. 10. This membership pricing schedule, more particularly the amount for each service or membership tier provided in FIG. 10, is merely an example, and is not intended to limit the scope of the present invention. Those of skill in the art will understand that any number of pricing and service combinations could be utilized in the context of massage chair 10 as described herein.

As can be seen in the chart 100 illustrated in FIG. 10, membership structure may be in a tiered system, both in relation to price and services provided. This example shows a monthly payment period for membership; however, other periods could be implemented, including weekly, bi-monthly, semi-annually, annually, etc. Along the top row of FIG. 10 are listed possible membership tiers including Premium, Express, and Massage Membership. Each membership tier includes the number of massage sessions which are included in the monthly price.

A person paying for a Premium Membership would have unlimited access to water and air adjustable massage sessions. According to this example, the periodic payment (on a monthly basis in the example) would be the highest for the Premium Membership tier, which affords a customer the most access to the services provided.

The Express (mid-level tier) membership would have a lower monthly fee but would also result in more limited access to the services provided. As in the example illustrated in FIG. 10, a person paying for the Express Membership would only have access to ten (10) water and air adjustable massage sessions as compared to unlimited access accorded to those paying for a Premium Membership.

Also shown in FIG. 10, a Massage Membership tier in which only five (5) water and air adjustable massage sessions would be available. This would be the lowest priced membership tier, and accordingly would be afforded the least amount of access to the water and air adjustable massage services.

It is further anticipated that alternative embodiments may provide options for an a la carte payment method. Payment would be on a per-service or per-access basis, each and every time a person sought such service or access. It is contemplated that prices for individual services would be higher than comparable services under the membership tiers available.

Again, the chart 100 illustrated in FIG. 10 is merely one example of a possible structuring mechanism for membership pricing for providing access to the present invention 10 or other related services in a commercial environment. Many other membership structures could be offered within the scope of the present invention herein described as would be understood by one of ordinary skill in the art. It is also contemplated that access to other health and wellness services may be included in the tiered membership structure, and prices for such memberships as well as access to such services would be determined accordingly.

The figures and descriptions in this application depict specific examples to teach those skilled in the art how to make and use the best mode of the invention. These examples are not given to limit the scope of the invention, but rather to teach inventive principles. To concisely teach inventive principles, some conventional aspects of the invention have been simplified or omitted. Those skilled in the art will appreciate many of the configurations, combinations, subcombinations, and variations on these examples that fall within the scope of the invention. For example, certain features of the invention described in separate embodiments can also be implemented in combination in a single embodiment. Conversely, various features that are described in the context of a single embodiment can also be implemented in multiple embodiments—separately or in any suitable subcombination. The invention is not limited to the specific illustrative examples described herein, but by all embodiments and methods within the scope and spirit of the invention as in the current, amended, or added claims and their equivalents. In any case, all substantially equivalent systems, articles, and methods should be considered within the scope of the invention.

What is claimed is:

1. A chair, comprising:

a chair body having a chair back, a chair seat, and a leg section;

a roller system comprising a plurality of massaging rollers and positioned within at least one of the chair back, the chair seat, and the leg section;

a liquid temperature control system for providing thermal therapy to a user, comprising:

a liquid cooler for cooling liquid of the system, a liquid heater for heating liquid of the system, an interior liquid pad fluidly coupled with said liquid cooler and heater and configured to be heated and cooled by liquid from the liquid cooler and heater, the interior liquid pad disposed within one of the chair back, the chair seat, and the leg section, and an exterior liquid pad fluidly coupled with said liquid cooler and heater by a flexible fluid line and configured to be heated and cooled by liquid from the liquid cooler and the liquid heater, wherein the exterior pad is disposed at an exterior of the chair and the flexible fluid line is configured to enable the exterior liquid pad to be moveably positioned on the user's body, wherein the interior liquid pad and exterior liquid pad are fluidly coupled with said liquid cooler and heater in parallel by separate liquid pumps such that the liquid temperature control system can independently control the liquid supplied to the interior pad from said liquid cooler and heater and independently control the liquid supplied to the exterior pad from said liquid cooler and heater, wherein the liquid supplied to the exterior pad is controlled separately from the liquid supplied to the interior pad; and an attached display configured to present control options to the user for operating the liquid temperature control system and the roller system and control both systems based on inputs received from the user.

2. The chair of claim 1, wherein each roller in the plurality of rollers comprises an inner roller, a liquid filled insert which surrounds the inner roller, and an outer protective material.

3. The chair of claim 1, wherein each roller in the plurality of rollers comprises an inner roller and a plurality of liquid filled inserts which surrounds the outer perimeter of the inner roller.

4. The chair of claim 1, wherein the liquid temperature control system is configured to rapidly heat or cool the interior and exterior pads 65 degrees Fahrenheit within 60 seconds.

5. The chair of claim 1, wherein the liquid temperature control system further comprises:

a pump configured to circulate liquid through the liquid heater and the liquid cooler;

a plurality of valves configured to regulate the circulation of liquid through the liquid temperature control system; and at least one drain configured to expel or recycle excess liquid from the liquid temperature control system.

6. The chair of claim 1, wherein:

the chair body has a surface that is smooth, moisture proof, and treated with an anti-bacterial additive;

the surface is configured to receive the user's body; and seams of the surface are unexposed.

7. The chair of claim 1, wherein each roller in the plurality of rollers comprises an inner roller comprising a thermoplastic elastomer, silicone, or foam material.

8. The chair of claim 1, wherein the leg section comprises massaging rollers of the plurality of massaging rollers configured provide massaging and compression to the legs of the user.

9. The chair of claim 1, wherein the attached display comprises a touch screen, and is configured to:

present a menu to the user of the massage chair, wherein the menu enables customization of a massage type, massage intensity, the interior and the exterior liquid pad temperature, roller position, and recline position of the massage chair;

be paired with a network, a computer, or a mobile device; and store user data and preferences for usage of the massage chair.

10. The chair of claim 1, wherein the massage chair is configured to recline to a variety of positions including a full recline position.

11. The chair of claim 1, wherein:

the massage chair further comprises a plurality of adjustable air bladders positioned within the chair back; and the plurality of adjustable air bladders are arranged into multiple sections including a center section configured to accommodate the curvature of the user's spine and support a portion of the lower back of the user.

12. The chair of claim 11, further comprising a plurality of adjustable air bladders embedded in the leg section of the massage chair and configured to constrict the legs of the user.

13. A liquid temperature control system of a therapeutic chair, comprising:

a liquid cooler for cooling liquid of the system;

a liquid heater for heating liquid of the system;

an interior liquid pad fluidly coupled with the liquid cooler and heater and configured to be heated and cooled by liquid from the liquid cooler and heater, the interior liquid pad disposed within the therapeutic chair;

an exterior liquid pad fluidly coupled with the liquid cooler and heater by a flexible fluid line and configured to be heated and cooled by liquid from the liquid cooler and heater, wherein the exterior pad is disposed at an exterior of the therapeutic chair and the flexible fluid line is configured to enable the exterior liquid pad to be moveably positioned on a user's body;

wherein the interior liquid pad and exterior liquid pad are each fluidly coupled with the liquid cooler and liquid heater, in parallel, by separate liquid pumps such that the liquid temperature control system independently controls the liquid supply to the interior pad and to the exterior pad, respectively; and a display configured to present control options to the user for operating the liquid temperature control system and control the liquid temperature control system based on inputs received from the user, wherein the user inputs comprise a first temperature setpoint for the interior liquid pad and a second temperature setpoint for the exterior liquid pad.

14. The liquid temperature control system of claim 13, wherein the liquid temperature control system is configured to rapidly heat or cool the interior and exterior pads 65 degrees Fahrenheit within 60 seconds.

15. The liquid temperature control system of claim 13, wherein the liquid temperature control system further comprises:

a pump configured to circulate liquid through the liquid heater and the liquid cooler;

a plurality of valves configured to regulate the circulation of liquid through the liquid temperature control system; and at least one drain configured to expel or recycle excess liquid from said heating and cooling system.

16. The liquid temperature control system of claim 13, wherein the display comprises a touch screen and is configured to:

present a menu to the user of the massage chair, wherein the menu enables customization of a temperature of the liquid in the liquid temperature control system;

be paired with a network, a computer, or a mobile device; and store user data and preferences between usage of the massage chair.

17. The liquid temperature control system of claim 13, wherein there are a plurality of the interior liquid pads and each of the plurality of the interior liquid pads are fluidly coupled with the liquid heater and liquid cooler in parallel by separate liquid pumps such that liquid flow to each of the plurality of interior liquid pads is independently controlled by the liquid temperature control system.

18. A chair, comprising:

a chair body having a chair back, a chair seat, and a leg section; and a liquid temperature control system for providing thermal therapy to a user, comprising:

a liquid cooler for cooling liquid of the system, a liquid heater for heating liquid of the system, a first interior liquid pad fluidly coupled with the liquid cooler and heater and configured to be heated and cooled by liquid from the liquid cooler and heater, the first interior liquid pad disposed within one of the chair back, the chair seat, and the leg section, a second interior liquid pad fluidly coupled with the liquid cooler and heater and configured to be heated and cooled by liquid from the liquid cooler and heater, the second interior liquid pad disposed within a different one of the chair back, the chair seat, and the leg section than the first interior liquid pad, and an exterior liquid pad fluidly coupled with the liquid cooler and heater by a flexible fluid line and configured to be heated and cooled by liquid from the liquid cooler and heater, wherein the exterior pad is disposed at an exterior of the massage chair and the flexible fluid line is configured to enable the exterior liquid pad to be moveably positioned on the user's body, wherein the first interior liquid pad, the second interior liquid pad, and the exterior liquid pad are each coupled in parallel with the liquid cooler and liquid heater by separate liquid pumps such that the liquid supply to the first interior liquid pad, the second interior liquid pad, and the exterior liquid pad is independently controlled by the liquid temperature control system.

19. The chair of claim 1, wherein the liquid temperature control system is configured to independently control temperatures of liquid supplied to the interior liquid pad and exterior liquid pad based on user inputs received via the attached display; the user inputs comprising a first temperature setpoint for the interior liquid pad and a second temperature setpoint for the exterior liquid pad.

20. The chair of claim 18, wherein the liquid temperature control system is configured to independently control temperatures of liquid supplied to each liquid pad based on user inputs received via the attached display; the user inputs comprising a first temperature setpoint for the first interior liquid pad, a second temperature setpoint for the second interior liquid pad, and a third temperature setpoint for the exterior liquid pad.

* * * * *